(12) United States Patent
Balk et al.

(10) Patent No.: US 8,322,512 B2
(45) Date of Patent: Dec. 4, 2012

(54) CONVEYING APPARATUS AND METHOD FOR SORTING PRODUCTS

(75) Inventors: Wouter Balk, Baambrugge (NL); Patrick Theodorus Johannes Van Haaster, De Zilk (NL); Howard Bradley Eisenberg, Woodbine, MD (US)

(73) Assignee: Eurosort B.V., Weesp (NL)

( * ) Notice: Subject to any disclaimer, the term of this patent is extended or adjusted under 35 U.S.C. 154(b) by 0 days.

(21) Appl. No.: 12/809,161

(22) PCT Filed: Dec. 19, 2008

(86) PCT No.: PCT/NL2008/050822
§ 371 (c)(1),
(2), (4) Date: Jan. 18, 2011

(87) PCT Pub. No.: WO2009/082212
PCT Pub. Date: Jul. 2, 2009

(65) Prior Publication Data
US 2011/0120834 A1     May 26, 2011

(30) Foreign Application Priority Data
Dec. 21, 2007    (NL) ..................................... 2001117

(51) Int. Cl.
*B65G 37/00*      (2006.01)
(52) U.S. Cl. ..................................... 198/347.4; 198/452
(58) Field of Classification Search ............... 198/347.1, 198/347.4, 580, 452, 453
See application file for complete search history.

(56) References Cited

U.S. PATENT DOCUMENTS

| 3,604,551 | A | * | 9/1971 | Fink | 198/347.1 |
| 4,397,384 | A | * | 8/1983 | Nohren, Jr. | 198/358 |
| 5,267,638 | A | | 12/1993 | Doane | |
| 6,412,621 | B1 | | 7/2002 | DeVree | |
| 6,648,124 | B1 | * | 11/2003 | Garvey | 198/452 |
| 6,959,802 | B1 | * | 11/2005 | Garvey | 198/347.4 |
| 7,322,459 | B2 | * | 1/2008 | Garvey | 198/347.4 |
| 7,441,645 | B2 | * | 10/2008 | Paquin et al. | 198/347.1 |

FOREIGN PATENT DOCUMENTS
WO    WO 01/28898    4/2001

OTHER PUBLICATIONS

Official Search Report of the European Patent Office in counterpart foreign application No. PCT/NL2008/050822 filed Dec. 19, 2008.
Written Opinion of the European Patent Office in counterpart foreign application No. PCT/NL2008/050822 filed Dec. 19, 2008.

* cited by examiner

*Primary Examiner* — James R Bidwell
(74) *Attorney, Agent, or Firm* — Steven M. Kochler; Westman, Champlin & Kelly, P.A.

(57) ABSTRACT

A conveying apparatus comprises a first conveyor for conveying products in a first conveying direction, which first conveyor comprises a first supply location, where a first series of products are supplied to the first conveyor via a first supply station, a second conveyor for conveying products in a second conveying direction, which second conveyor comprises a second supply location, where a second series of products are supplied to the second conveyor via a second supply station. The conveying apparatus further comprises a channelling element for channelling at least one product out from the second conveyor, and a channelling conveyor for conveying a channelled-out product from channelling element.

9 Claims, 1 Drawing Sheet

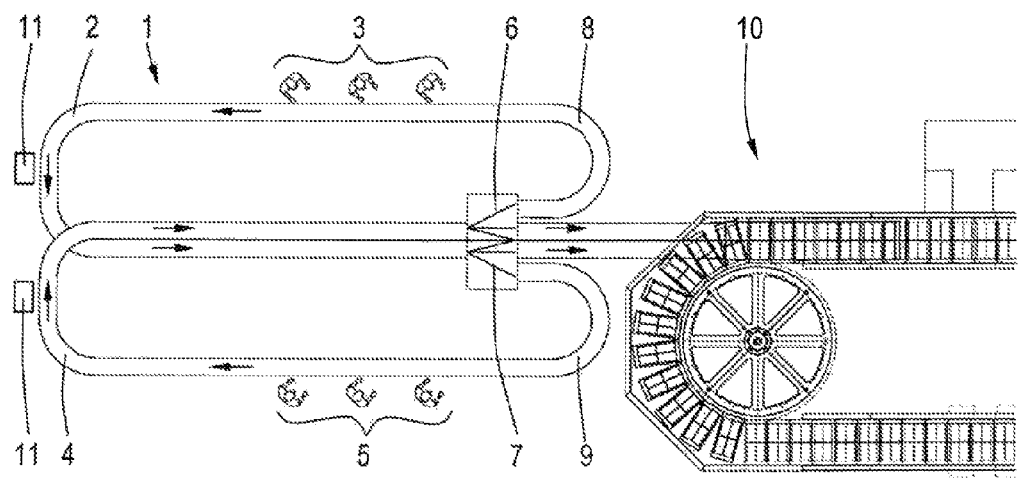

CONVEYING APPARATUS AND METHOD FOR SORTING PRODUCTS

CROSS-REFERENCE TO RELATED APPLICATION

The present application is a national stage filing of International patent application Serial No. PCT/NL2008/050822, filed Dec. 19, 2008, and published as WO 2009/082212 in English.

BACKGROUND

The discussion below is merely provided for general background information and is not intended to be used as an aid in determining the scope of the claimed subject matter.

Aspects of the invention relates to a conveying apparatus.

In a conveying apparatus comprising several product flows, the need may be felt in practice to move a product from one product flow to another product flow. In the case of a continuous product flow, however, it is problematic to add a product from another product flow, for example because there may be no space for it on a conveyor.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is to provide a conveying apparatus by means of which a product from one product flow can be introduced into another product flow in a simple manner. The conveying apparatus includes a first conveyor for conveying products in a first conveying direction, which first conveyor comprises a first supply location, where a first series of products are supplied to the first conveyor via a first supply station, a second conveyor for conveying products in a second conveying direction, which second conveyor comprises a second supply location, where a second series of products are supplied to the second conveyor via a second supply station, a channelling element for channelling at least one product out from the second conveyor, and a channelling conveyor for conveying a channelled-out product from said channelling element, said channelling conveyor and said first supply station being arranged and cooperating with the first conveyor in such a manner that a product that has been channelled out from the second conveyor and said first series of products are supplied to the first conveyor so as to jointly form an at least substantially continuous product flow.

The conveying apparatus provides a possibility of channelling out a product from the second conveyor and carrying it to the first conveyor via the channelling conveyor, which in fact functions as a buffer. The product need not be inserted into a continuous flow at the first conveyor in that case, but the channelled-out product can be added to the first series of products in cooperation with the first supply station, so that the channelled-out product and the first series of products supplied by the first supply station can jointly form a continuous product flow, which product flow is conveyed by the first conveyor.

In the case of a continuous product flow, products which are spaced close together at a conveying element, such as a conveyor belt, may be considered, for example. A conveyor belt may for example be provided with discrete positions, which are indicated visually or, for example, by upright edges which are separated from each other. The products can be placed on said discrete positions by the first supply station, so that there is no space between two successive positions for placing a product. In practice, an empty position (without a product being present at that position) may occasionally occur in such a continuous product flow, of course. The products to be conveyed may be of a varying nature, such as books, clothes, CDs, postal items, etc.

It is noted that a conveying apparatus is also referred to as an induction conveying apparatus in professional circles.

The channelling conveyor may be functionally connected to the first conveyor upstream of the first supply location, on the side of the first supply location that is opposed to the first conveying direction. The advantage of this embodiment is that the first supply of the first series of products to the first conveyor can be controlled at the first supply location on the basis of the number of passing channelled-out products from the second conveyor.

In a practical embodiment, the apparatus may comprise a second channelling conveyor and a second channelling element for channelling at least one product from the first conveyor to the second channelling conveyor, said second channelling conveyor being functionally connected to the second conveyor upstream of the second supply location, on the side of the second supply location that is opposed to the second conveying direction. As a result, products can also be channelled out from the first conveyor and be added to the second series of products at the second conveyor.

In one embodiment, the channelling conveyor is integrated with the first conveyor and/or the second channelling conveyor is integrated with the second conveyor. The channelling conveyor and the first conveyor may thus comprise one conveyor belt, for example, thereby obviating the need for a transition between a separate channelling conveyor and the first conveyor. The same goes for the second channelling conveyor and the second conveyor.

The second conveyor may comprise an endless belt for carrying and conveying products thereon, whilst the channelling element is an activable moving element for moving products to be channelled out from the second conveyor in lateral direction relative to the second conveying direction. Said moving element may for example comprise a very quickly acting mechanism, making it possible to channel a single product out from a series of products.

The second conveyor may be provided with product recognition devices for detecting products, and a control unit may be provided, which controls the channelling element on the basis of a signal received from the product recognition devices. This makes it possible to make a selection of the products to be channelled out. Similar means may be provided for controlling the second channelling element, of course.

The apparatus may be provided with a control unit, which controls the amount of products supplied to the first conveyor at the first supply location in dependence on the amount of products channelled out from the second conveyor and presented to the first conveyor, so as to form an at least substantially continuous flow of products at the first conveyor. In this case the first supply of the first series of products to the first conveyor is automated, but it is also possible to supply the products manually to the first conveyor, so that the continuous flow of products is in fact controlled by the person who supplies the first series of products to the first conveyor. Said person will stop the first supply for a moment as soon as a channelled-out product passes the first supply location.

In one embodiment, the product removed at the second conveyor is supplied to the first conveyor in priority to the first series of products, and/or the product removed at the first conveyor is supplied to the second conveyor in priority to the second series of products. This has been found to lead to a successful control of the process.

It is noted that when products are channelled out from the first and/or the second conveyor, the product flows will no longer be continuous after said channelling has taken place.

An aspect of the invention also relates to a method for sorting products from different continuous product flows, wherein a first series of products are supplied to a first conveyor, after which said first series of products are conveyed in the first conveying direction by the first conveyor, and wherein a second series of products are supplied to a second conveyor, after which said second series of products are conveyed in a second conveying direction by the second conveyor, wherein a product from said second series of products is removed at the second conveyor and supplied to the first conveyor together with said first series of products, and wherein a product from said first series of products is removed at the first conveyor and supplied to the second conveyor together with said second series of products.

BRIEF DESCRIPTION OF THE DRAWINGS

Aspects of the invention will now be explained in more detail with reference to a drawing, which schematically shows an embodiment of the invention.

FIG. 1 is a top plan view of an embodiment of a conveying apparatus.

DETAILED DESCRIPTION OF THE ILLUSTRATIVE EMBODIMENT

FIG. 1 shows an embodiment of the conveying apparatus I. The conveying apparatus 1 comprises a first conveyor 2. In this case the first conveyor 2 is an endless belt, which conveys a first series of products in a first conveying direction, as is indicated by arrows in FIG. 1. In this embodiment, the first series of products are supplied to the first conveyor 2 at a first supply location 3 by persons who place the products on the conveyor 2. In FIG. 1, the supply station is illustrated in the form of three persons, but the number of persons may be greater or smaller than three, of course. Moreover, the supply of products can take place automatically.

The embodiment also comprises a second conveyor 4, which extends largely parallel to the first conveyor 2 in this case, but this is not necessary. The second conveyor 4 has a second supply location 5, where a number of persons form the second supply station in this example. Said persons place products on the conveyor belt and a second series of products are conveyed in a second conveying direction by the second conveyor 4.

The embodiment of the conveying apparatus 1 is further provided with a channelling element 6 and a second channelling element 7. The channelling element 6 is capable of channelling a product from the second conveyor 4 to a channelling conveyor 8, whilst the second channelling element 7 is capable of channelling products from the first conveyor 2 to a second channelling conveyor 9.

The channelling conveyor 8 has the same conveying direction as the first conveyor 2, and in this embodiment the two conveyors are integrated. The channelling conveyor 8 and the first conveyor 2 are in fact conveying path sections of one and the same conveyor belt, which extend in line with each other. In this case the channelled-out products need not be moved from the channelling conveyor 8 to the first conveyor 2 via a separate transition, therefore. In this embodiment, the products that have been channelled out from the second conveyor 4 are supplied to the first conveyor 2 on the upstream side of the first supply location 3.

In the embodiment of the conveying apparatus 1 that is shown in FIG. 1, the second channelling conveyor 9 is connected to the second conveyor 4 in the same manner as described above with regard to the channelling conveyor 8 and the first conveyor 2.

The channelling element 6 and the second channelling element 7 are activable moving elements, which are capable of moving a product to be channelled out in lateral direction relative to the first and the second conveying direction, respectively. It is also conceivable for the channelling element to be arranged in such a manner that a product is channelled out in vertical direction. The channelling element is in that case a short conveyor belt, which can swing out upwards and/or downwards and which moves the channelled-out product to a channelling conveyor disposed thereabove or therebelow.

During operation of the conveying apparatus 1, a product that has been channelled out from the second series of products at the second conveyor 4 will arrive at the first conveyor 2 upstream of the first supply location 3 via the channelling conveyor 8. The persons who supply the first series of products to the first conveyor 2 at the first supply location 3 can see the channelled-out product passing while supplying the products. This means that it is not possible to supply a product to the first conveyor 2 at that occupied position on the first conveyor 2. The number of products from the first series of products that is supplied to the first conveyor 2 at the first supply location 3 is thus arranged to depend on the number of products being channelled out and presented to the first conveyor 2. The same method may of course also be used with the products which are channelled out from the first conveyor 2 and added to the second series of products, which products are supplied to the second conveyor 4 at the second supply location 5. The conveying apparatus 1 may also be provided with a control unit (not shown), in which this process is automated. The aforesaid persons may be substituted for a mechanical first and/or second supply station. In this way it is possible to supply a continuous flow of products to the first conveyor 2 and the second conveyor 4. A direct transfer of products from the first conveyor to the second conveyor, or vice versa, is not possible, because no space will be available for these products on the conveyor belt in the case of a continuous product flow.

FIG. 1 further shows an example of a downstream apparatus, in this case comprising a sorting device 10, which comprises a conveying element provided with containers, each container comprising two carriers which can be driven independently of each other. The products from the first conveyor and the products from the second conveyor are supplied to the respective carriers. Eventually, the products that have not been channelled out and the channelled-out and repositioned products will end up at the sorting device 10. Alternative downstream apparatuses are conceivable, of course, and the conveying apparatus according to the invention does not necessarily have to cooperate with the sorting apparatus numeral 10 shown in FIG. 1.

In practice a situation is therefore conceivable in which a product from the first series of products or from the second series of products must end up on opposing carriers, so that it is possible to effect alternation by means of the above conveying apparatus 1.

Although the illustrated embodiment only comprises a first and a second conveyor 2, 4, it is also conceivable to use an embodiment which comprises more than two conveyors.

The embodiment of the conveying apparatus that is shown in FIG. 1 may also be used as a buffering apparatus. In that case a product does not necessarily have to be moved from the first conveyor 2 to the second conveyor 4, which would be necessary in the case of a downstream apparatus, but the purpose is to buffer a product for a moment, for example because the product need not be conveyed to a downstream apparatus yet. In that case a product may be channelled from the second conveyor 4 to the channelling conveyor 8, for example, and subsequently be supplied to the first conveyor 2. The product is subsequently channelled from the first conveyor 2 to the second conveyor 4 by the second channelling element 7 via the second channelling conveyor 9. The product will thus end up on the second conveyor 4 again. In the configuration shown in FIG. 1, the products will follow an eight-shaped path, therefore.

FIG. 1 also shows product recognition means 11. Said means are capable of recognising the products that pass on the first and the second conveyor 2, 4, and controlling the channelling elements 6, 7 via a control unit on the basis thereof. The product recognition means 11 may be bar code readers or cameras, for example.

It will be apparent from the foregoing that the apparatus according to aspects of the invention provide a conveying apparatus by means of which products from one product flow can be introduced in another product flow in a simple manner.

The invention is not restricted to the embodiment as described above and shown in the drawings, which can be varied in several ways without departing from the scope of the invention. The first and the second conveyor need not be conveyor belts, for example, on which the products are supported, but they may also be conveying elements from which products are suspended.

The invention claimed is:

1. A conveying apparatus, comprising a first conveyor configured to convey products in a first conveying direction to a first output location, which first conveyor comprises a first supply location, where a first series of products are supplied to the first conveyor via a first supply station, a second conveyor configured to convey products in a second conveying direction to a second output location, which second conveyor comprises a second supply location, where a second series of products are supplied to the second conveyor via a second supply station, a channelling element configured to channel selectively at least one product out from the second conveyor or allow a product to proceed to the second output location, and a channelling conveyor configured to convey a channelled-out product from said channelling element, said channelling conveyor and said first supply station being arranged and cooperating with the first conveyor in such a manner that a product that has been channelled out from the second conveyor and said first series of products are supplied to the first conveyor so as to jointly form an at least substantially continuous product flow to the first output location.

2. The conveying apparatus according to claim 1, wherein the channelling conveyor is functionally connected to the first conveyor upstream of the first supply location, on the side of the first supply location that is opposed to the first conveying direction.

3. The conveying apparatus according to claim 2, wherein the apparatus comprises a second channelling conveyor and a second channelling element configured to channel selectively at least one product from the first conveyor to the second channelling conveyor or allow a product to proceed to the first output location, said second channelling conveyor being functionally connected to the second conveyor upstream of the second supply location, on the side of the second supply location that is opposed to the second conveying direction.

4. The conveying apparatus according to claim 3, wherein the channelling conveyor is integrated with the first conveyor and/or the second channelling conveyor is integrated with the second conveyor.

5. The conveying apparatus according to claim 1, wherein at least the second conveyor comprises an endless belt configured to convey products thereon, and wherein the channelling element is an activatable moving element configured to move products to be channelled out from the second conveyor in lateral direction relative to the second conveying direction.

6. The conveying apparatus according to claim 1, wherein the apparatus is provided with a control unit, which controls the amount of products supplied to the first conveyor at the first supply location in dependence on the amount of products channelled out from the second conveyor and presented to the first conveyor, so as to form an at least substantially continuous flow of products at the first conveyor.

7. The conveying apparatus according to claim 1, wherein at least the second conveyor is provided with product recognition device configured to detect products, and wherein a control unit is provided, which controls the channelling element on the basis of a signal received from the product recognition device.

8. A method for sorting products from different continuous product flows, wherein a first series of products are supplied to a first conveyor, after which said first series of products are conveyed in a first conveying direction by the first conveyor toward a first output location, and wherein a second series of products are supplied to a second conveyor, after which said second series of products are conveyed in a second conveying direction by the second conveyor toward a second output location, wherein a product from said second series of products is removed selectively at the second conveyor and supplied to the first conveyor together with said first series of products rather than to the second output location, and wherein a product from the said first series of products is removed selectively at the first conveyor and supplied to the second conveyor together with said second series of products rather than to the first output location.

9. The method according to claim 8, wherein the product removed at the second conveyor is supplied to the first conveyor in priority to the first series of products, and/or the product removed at the first conveyor is supplied to the second conveyor in priority to the second series of products.

* * * * *